United States Patent [19]

Bianco et al.

[11] Patent Number: 4,816,659
[45] Date of Patent: Mar. 28, 1989

[54] BAR CODE READER HEAD

[75] Inventors: James S. Bianco, Enfield, Conn.; Emile Darcy, Chicopee; Bernard Drummond, Southwick, both of Mass.

[73] Assignee: Control Module Inc., Enfield, Conn.

[21] Appl. No.: 108,139

[22] Filed: Oct. 13, 1987

[51] Int. Cl.[4] ............................................. G06K 7/10
[52] U.S. Cl. .................................. 235/462; 235/454; 235/470
[58] Field of Search ............... 235/435, 454, 462, 463, 235/468, 470

[56] References Cited

U.S. PATENT DOCUMENTS

| | | | |
|---|---|---|---|
| 4,408,120 | 10/1983 | Hara et al. | 235/462 |
| 4,465,926 | 8/1984 | Apitz et al. | 235/454 |
| 4,591,706 | 5/1986 | Sims | 235/454 |
| 4,647,768 | 3/1987 | Ohta | 235/454 |

Primary Examiner—A. D. Pellinen
Assistant Examiner—Jeffrey A. Gaffin
Attorney, Agent, or Firm—John H. Crozier

[57] ABSTRACT

A bar code reader head having an optical block with cavities formed therein into which various optical elements may be placed without the need for any adjustment thereof. A first illumination source, producing any desired spectrum of light, illuminates at least a portion of the bar code. A second illumination source may be provided to produce a second spectrum of light. Reflected light passes through a lens in front of which is an aperture slit parallel to the bar code bars. A channel is formed between the lens and a photodetector perpendicular to the light path. If both visible and infrared illumination sources are used, visible light is focused at the side of the channel toward the lens and infrared light is focused at the other side of the channel. In the channel is a template having at least one discriminator slit parallel with the slit in front of the lens. The width of the discriminator slit depends upon the widths of the bars to be read. With visible light, the template is positioned with the slit at the side toward the lens. With infrared light, the template is positioned with the slit at the other side. Alternatively, a specially designed lens may be employed to focus both visible and infrared light at one side of the channel. The template may have additional slits for changing the resolution of the device by moving the template to align a slit having a different width with the light path, thus allowing use of the device with different bar codes having substantially different bar widths.

24 Claims, 4 Drawing Sheets

BAR CODE READER HEAD

BACKGROUND OF THE INVENTION

1. Field of the Invention.

The present invention relates to bar code readers generally and more particularly to a novel reading head for such devices and one which may be used with illuminating light of different wavelengths and for reading different bar codes having substantially different widths of bars.

2. Background Art.

Bar codes have found application in a wide variety of applications as an information source, typically for digital processors. Such bar codes are used at point-of-sale in merchandising for pricing and inventory count, in controlled personnel access systems, and in manufacturing for work-in-process and inventory control, to name only a few applications. The bar codes themselves comprise a series of parallel lines, typically in the range of about ⅛" to 1" in height and from about 1 to 50 mils in thickness, arrayed on a contrasting background. The lines may variously have unequal spacings and/or unequal thicknesses, with the variations in spacing and/or thickness determined by the information "stored" in the bar code. A bar code is "read" by serially illuminating the bars, with the bars absorbing the light and the background reflecting the light. The resulting pattern of reflection and nonreflection is sensed by a light detecting device which provides input to the digital processor. The reader head may be of the type that is passed over the bar code or of the type with which the bar code is moved passed the reading head, such as might be used with a personal identification card. While the present invention is directed generally toward the latter type, it will be understood that it may be modified and applied to the former type, as well, or even where there is no relative motion, by one having ordinary skill in the art.

One class of conventional bar code reader heads comprises those that are point detectors; that is, the detecting device is focused at a single, relatively small point. Such a reader head is described, for example, in U.S. Pat. No. 4,143,809, to Uebbing et al. These readers have two major disadvantages. First, since the detector is focused at a point on the bar code, the reader has a very short depth of field, possibly on the order of 5 mils at a distance of 300 mils from the focusing lens. This means that the substrate carrying the bar code must be accurately placed in distance from the lens in order to provide good resolution. Second, if a bar on the bar code is unintentionally broken or otherwise defective at the point of focus, it will be detected as being absent, thus providing misinformation to the data processor.

A further limitation of conventional devices is that no known bar code reader heads have the desirable ability to employ either visible or infrared illuminating light in the same device, although such would be advantageous in some applications. Typically, visible red light generated by a light emitting diode (LED) is used for reading visible bar codes, or bar codes that cannot be read with infrared radiation such as thermally printed bar codes with low carbon content. These bar codes are useful where it is convenient to be able to visually read the bar codes or to identify them as such. However, in some applications, it is necessary to read "masked" bar codes, such as those described in U.S. Pat. No. 4,359,633 to Bianco, titled "Spectrally-Limited Bar-Code Label and Identification Card". In the latter applications, infrared illumination is used to read bar codes that cannot be read visually.

Additionally, no known bar code reader heads have the desirable ability to be adjusted for use with different bar codes having bars of substantially different widths.

A further limitation of known bar code reader heads is that they are of relatively complicated manufacture and require relatively precise adjustment during or after manufacture.

Accordingly, it is a principal object of the present invention to provide a bar code reader head that may be used with more than one frequency range of illuminating light.

It is a further object of the present invention to provide a bar code reader head that can be adjusted for use with different bar codes having bars of substantially different widths.

It is a another object of the present invention to provide a bar code reader head that has a relatively deep depth of field and which reads a substantial height of each bar.

It is an additional object of the present invention to provide a bar code reader head achieving the above objects while being of relatively simple manufacture and without requiring relatively precise adjustments either during or after manufacture.

Other objects of the present invention will, in part, be obvious and will, in part, appear in the following description.

SUMMARY OF THE INVENTION

The bar code reader head of the present invention substantially overcomes the limitations of known conventional devices by providing a body, or optical block, which may simply and conveniently injection molded using a thermoplastic. The optical block may include cavities formed therein into which the various optical elements may be placed, without the need for any adjustment thereof. An unfocused first illumination source in the optical block illuminates a a least a portion of the bar code to be read as the bar code moves relative to the reader head. The illumination source may produce any desired spectrum of light. A second illumination source may be provided in the block to increase the intensity of light in the same spectrum or it may produce illumination in a second spectrum. Reflected light from the bar code passes through a first lens in front of which is a slit parallel to the bars of the bar code for providing increased depth of field. Focused light from the first lens passes through the optical block to a photodetector which may have a second lens on the front thereof to improve collection of light to the detector, allowing for less exacting manufacturing tolerances.

A channel is formed between the first and second lenses and perpendicular to the light path. If, say, both visible red and infrared illumination sources are being used, the channel is positioned and dimensioned such that visible red light will be focused at the side of the channel toward the first lens and infrared light will be focused at the side of the channel toward the second lens. Removably disposed in the channel is a template having, preferably, a resilient body with a clear backing on one surface thereof and a black film on the other surface thereof. The black film has formed therein at least one discriminator slit parallel with the slit in front of the first lens. The width of the discriminator slit depends upon the widths of the bars to be read. When visible red light is used, the template is positioned with the slit side toward the first lens. When infrared light is used, the template is positioned with the slit side toward the second lens. The template may have additional slits for changing the resolution of the device by sliding the template to align a slit having a different width with the light path, thus allowing use of the device with different bar codes having substantially different bar widths. In one embodiment, the light path is folded through use of a mirror disposed between the first lens and the channel to provide for a reduced dimension perpendicular to the plane of the bar code.

DESCRIPTION OF THE PREFERRED EMBODIMENTS

Figure 1:
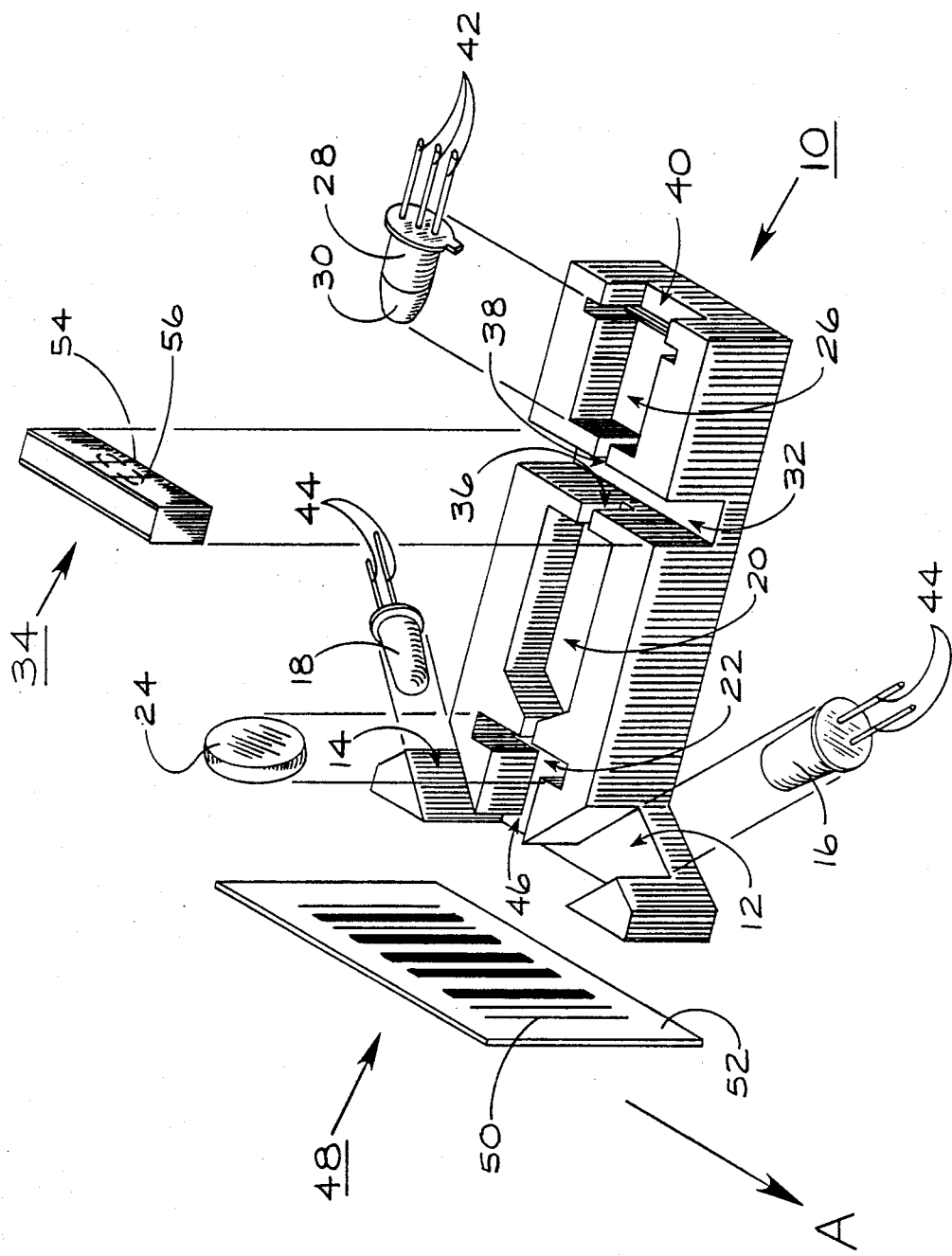
FIG. 1 is an enlarged, exploded perspective view of one embodiment of the present invention.

Referring now the Drawing, FIG. 1 shows an enlarged perspective view of one embodiment of the present invention which includes an optical block, generally indicated by the reference numeral 10, which defines: cavities 12 and 14 for the placement of illuminating sources 16 and 18, respectively; an elongated channel 20; cavity 22 for the placement of a first lens 24; a cavity 26 for the placement of a photodetector 28 which may have an integral second lens 30; channel 32 for the placement of template 34, said channel extending in width between a first opening 36 defined by the end of elongated channel 20 and a second opening 38 in front of second lens 30. Template 34 has defined therein a first discriminator slit 54 and may have defined therein a second discriminator slit 56. Cavity 26 has defined at the distal end thereof an opening 40 to accommodate the leads 42 of photodetector 28. The distal ends of cavities 12 and 14 are similarly open for connection of leads 44 of illuminating sources 12 and 14 to conventional external circuitry (not shown). Elongated channel 20 further defines a first slit 46 which serves as an aperture reduction in front of first lens 24 to provide for increased depth of focus for the first lens. Having a long slit 46 allows first lens 24 to "look" at a substantial height of bar, thus reducing the effect of edge irregularities and density variations over the bar. Lid means (not shown) may be placed over optical block 10 to hold the internal elements in position.

Illuminating sources 16 and 18, first lens 24, and photodetector 28 may be of any conventional type known in the art. Photodetector 28 may be provided without second lens 30, but that lens is useful in gathering additional light so that less critical dimensional tolerances may be accommodated.

In operation, illuminating sources 16 and/or 18, which may be visible and/or infrared LEDs, or other illuminating sources known in the art, illuminate a bar code 48 which is moving relative to optical block 10 in the direction indicated by "A" on FIG. 1. First lens 24 is preferably disposed so that the optical axis thereof is substantially orthogonal to the plane of bar code 48. The light from illuminating sources 16 and/or 18 preferably strikes bar code 48 at an angle of approximately 45 degrees from the optical axis of first lens 24. Light is absorbed by the bars, as at 50, and reflected by the bar code substrate 52. The reflected light passes through first slit 46 in the front of elongated channel to first lens 24. The light exiting first lens 24 continues to pass through elongated channel 20 and depending on its wavelength, is focused either at a plane intersecting first opening 36 or at a plane intersecting second opening 38, both planes being perpendicular to elongated channel 20. If the illuminating source is visible red, the light will be focused at first opening 36. If the illumination is infrared, the light will be focused at second opening 38. Depending on the illuminating source, template 34 is positioned so that one of discriminator slits 54 or 56 is at the opening where the light is focused. The discriminator slit is preferably chosen so that its width is somewhat less than the narrowest bar 50 of bar code 48. Whichever type of illuminating light is used, second lens 30 gathers the available light through opening 38 and passes the same to photodetector 28.

The present invention may also use a first lens, known in the art, designed to focus both infrared and visible light at only one of first and second openings 36 and 38.

Figure 2:
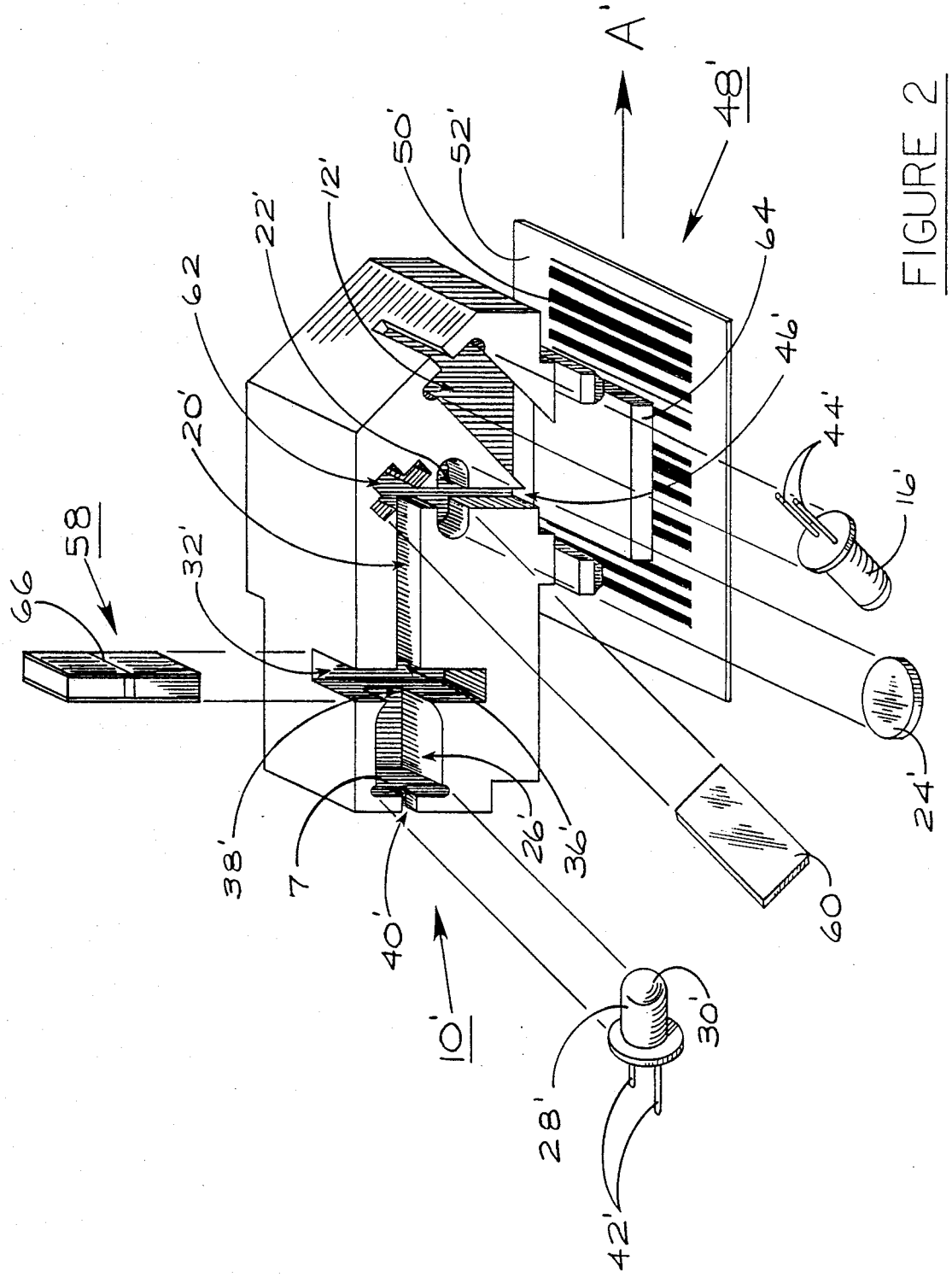
FIG. 2 is an enlarged, exploded perspective view of another embodiment of the present invention.

Referring now to FIG. 2, there is provided a "folded" embodiment of the present invention shown on FIG. 1, with like elements having primed reference numerals. The embodiment shown on FIG. 2 is advantageous when it is important to minimize the length of the bar code reader head in the dimension perpendicular to the plane of bar code 48'. In this embodiment is included mirror 60 which bends focused light from first lens 24' in elongated channel 20' about 90 degrees to template 58. Cavity 62 is provided to position mirror 60 in optical block 10'. Also in this embodiment is a clear window member 64 which is provided to seal the front of optical block 10'. A lid (not shown) may be provided to hold the internal elements in place. In the embodiment shown, template 58 has a single discriminator slit 66, as channel 32' is not designed to allow back-and-forth movement of the template between two or more positions. When it is desired to employ a different discriminator slit, template 58 is "moved" by removing it and replacing it with a template having a different width slit. Also, in this embodiment, the single illuminating source 16' may be chosen to produce any of two different spectra of light wavelengths. The operation of the embodiment of the present invention shown on FIG. 2 is similar to the operation of the embodiment shown on FIG. 1.

Figure 4:
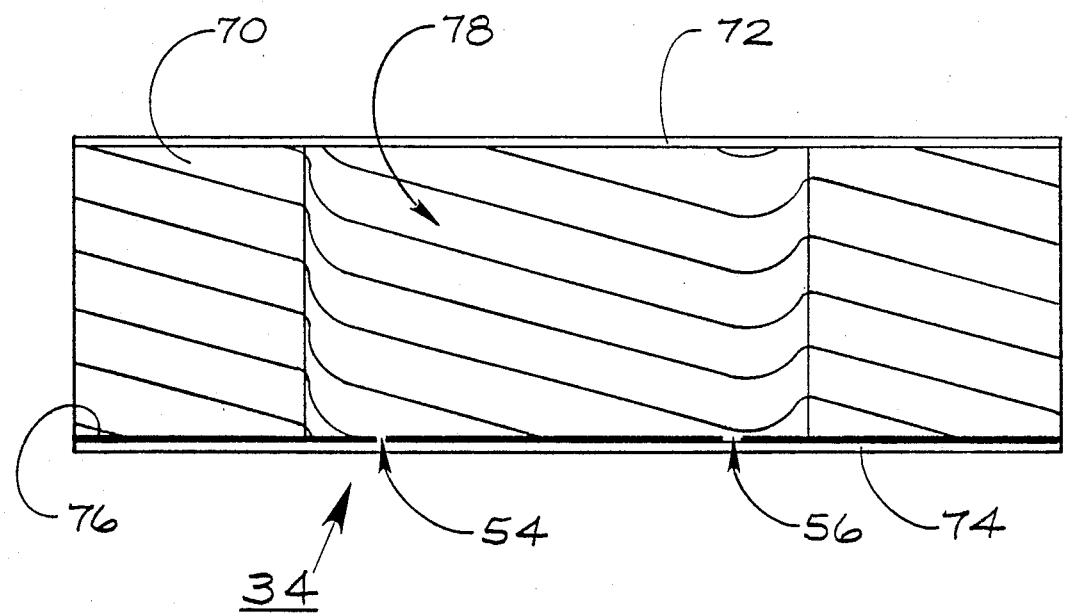
FIG. 4 is an enlarged cross-sectional view of the template of FIG. 3.
Figure 3:
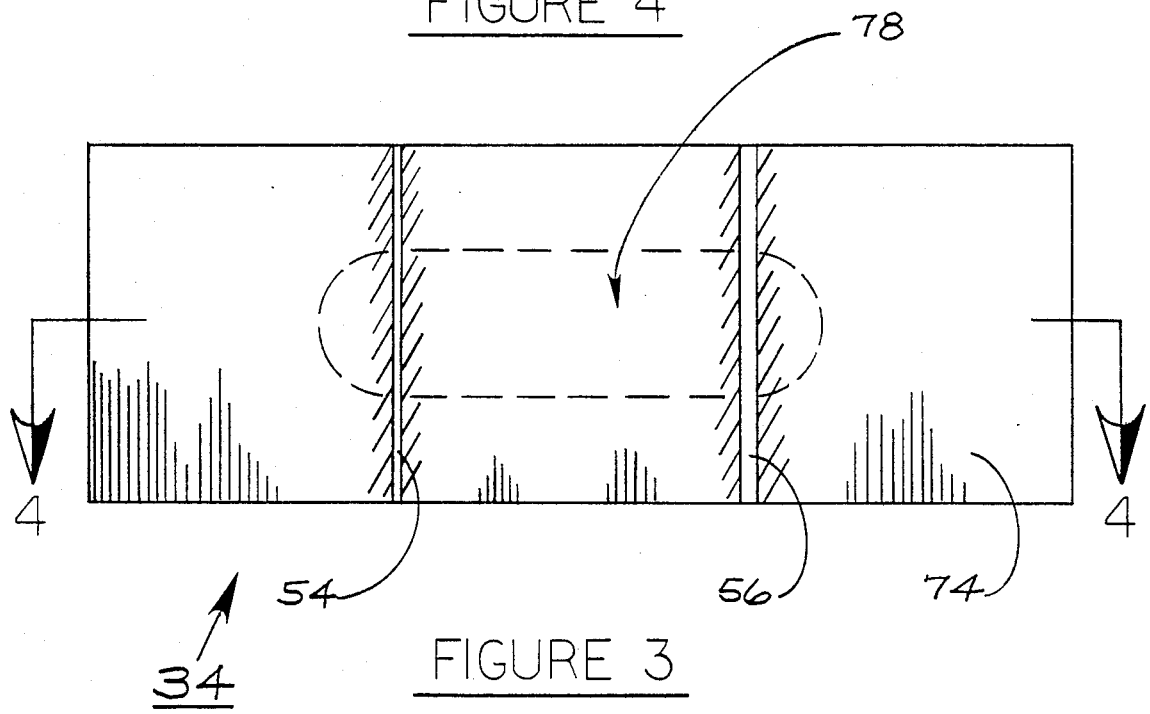
FIG. 3 is an enlarged front elevation view of the template of the embodiment shown on FIG. 1.

Referring now to FIG. 3, a front elevation of template 34 of FIG. 1, and FIG. 4, a cross-sectional view of template 34, template 34 includes a resilient substrate 70, preferably formed of a cellular plastic material having a first clear, resilient backing 72 on one face thereof for structural rigidity. On the other face of template 34 is a second clear resilient material 74 having a "black" inside surface 76 which does not transmit the wavelengths of light to be used and which may be photographic emulsion. When photographic film is used, the photoemulsion 76 is preferably placed on the inside surface of clear material 74, as shown, to avoid scratching. Formed in black surface 76 are first and second discriminator slits 54 and 56, which are preferably exposed areas of the photoemulsion of the black surface, and which have different widths as shown. Of course, additional discriminator slits may be provided, as well. Template 34 defines an open passage 78 extending between first and second resilient backings 72 and 74 to permit the transmission of light through the template.

Figure 5:
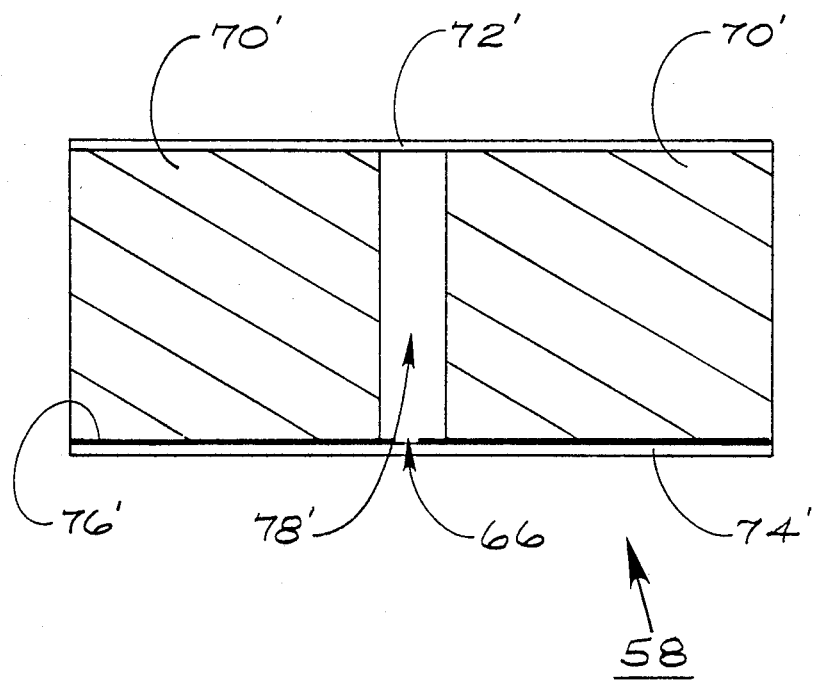
FIG. 5 is an enlarges top plan view of the template of the embodiment shown on FIG. 2.

FIG. 5 is a top plan view of template 58 of FIG. 2, with primed reference numerals indicating like elements in template 34 of FIGS. 1, 3 and 4, and shows a construction similar to that of template 34 of FIGS. 1, 3, and 4, except that, in the case of template 58, open passage 78' is not punched from substrate 70', but rather is formed between two separate strips of the substrate, as is further described below. Substrate 70 has a slight resiliency and has a natural thickness dimension somewhat greater than channel 32 so as to removably hold template 34 in the channel in the desired position when slightly compressed, although any means known in the art may be used to hold the substrate in position. As noted above with reference to FIG. 1, one of slits 54 or 56 is placed adjacent first opening 36 at the end of channel 20 when light in the visible range is being used, as first lens 24 focuses visible light at that distance from the lens. When light in the infrared range is being used, one of slits 54 or 56 is placed at second opening 38 adjacent second lens 30, as first lens 24 focuses infrared light at that distance from the first lens. The choice of which of slits 54 and 56 is to be used depends upon the narrowest bar 50 on the bar code 52 to be read. Since the slit determines the amount of the bar code "read" by the photodetector, it is necessary to limit that amount so that the photodetector can discriminate between bars. It has been found that providing a discriminator slit that is about 75% of the width of the narrowest bar on the bar code gives good resolution. One could use a very narrow slit to read all bar codes; however, because of less critical dimensional tolerances used with bar codes having wider bars, there would be poor resolution, the focused image would not be clear, and the signal from the reader would be noisy.

Template 34 may be conveniently constructed in quantity by providing a sheet of resilient substrate 70 of urethane foam and punching columns of open passages therethrough. Then a heavy clear plastic first sheet of backing material 72 is adhesively attached to one side of substrate 70. A second heavy clear plastic sheet of material 74 furnished with a photoemulsion on one side is exposed and processed to produce a series of parallel clear lines on a black background, with the width of the lines being equal to the desired width of slits 54 and 56. The second sheet is adhesively attached to the other side of substrate 70 so that slits 54 and 56 are in line with open passages 78 and the assembly cut to produce templates 34.

Template 58 may be conveniently constructed in quantity by exposing and processing a heavy clear plastic second sheet 74' with photoemulsion on one side to produce a series of parallel clear lines on a black background, with the width of the lines being equal to the desired width of slit 66. Then, strips of urethane foam substrate 70' are placed between the lines. The foam strips may be as manufactured by The 3M Company, having an adhesive on two opposite sides covered with a release paper. First, the release paper on one side is stripped off and the foam strips are placed on the photoemulsion side of the first sheet. Then, the release paper on the other side of the strips is removed and the first clear plastic sheet 72' is placed on the strips. The resulting sandwich may then be cut into templates 58.

The clear plastic sheets 72, 72', 74, and 74' may be of any material known in the art, provided that it does not substantially color with age.

Thus, uniquely, a single element of optical blocks 10 and 10', respectively, templates 34 and 58, permit use of the optical blocks with illuminating sources of different wave lengths, and with different bar codes having substantially different widths of bars, with no changes or adjustments to the optical block other than changing the placement of the templates in their respective channels 32 and 32.

Although not critical to the practising of the present invention, optical block 10 is preferably constructed by the injection molding of an engineering thermoplastic such as Noryl manufactured by The General Electric Company, although any material having desirable characteristics, such as dimensional stability, known in the art may be used as well. Additionally, in the embodiment shown, the optical block is preferably configured as shown so that it may be simply molded as a side-pullout casting. Following the molding step, the internal components are easily placed in their respective cavities manually or robotically. Since the casting provides for proper placement dimensionally, there is no need to make any final adjustments during or after insertion of the internal components. All internal components are conventional components which are readily available, with the exception of the template which is simply constructed.

Thus, what has been described is a novel bar code reader head that is compact and easily manufactured, that can be used with different wavelength ranges of illuminating light, and that may be used to read different bar codes having substantially different width bars.

It will thus be seen that the objects set forth above, among those made apparent from the preceding description are efficiently attained and, since certain changes may be made in the above construction without departing from the scope of the invention, it is intended that all matter contained in the above description or shown on the accompanying Drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A bar code reader head, comprising:
   (a) a body;
   (b) a first illuminating source producing a first spectrum of light wavelengths disposed within said body so as to illuminate at least a portion of a bar code;
   (c) a first lens disposed within said body to focus said first spectrum of light wavelengths reflected from said bar code, said reflected light being focused at a first focusing plane within said body distant from said first lens;
   (d) detector means disposed within said body on the side of said first focusing plane opposite said first lens to detect light focused by said first lens; and
   (e) discriminator means disposed within said body and placed at said first focusing plane, such as to limit the width of said bar code which can be seen by said detector means.

2. A bar code reader head, as defined in claim 1, further comprising:

(f) a second illuminating source producing a second spectrum of light wavelengths disposed within said body, in place of said first illuminating source, so as to illuminate at least a portion of said bar code; and (g) said first lens focusing said second spectrum of light wavelengths reflected from said bar code at a second focusing plane distant from said first lens.

3. A bar code reader head, as defined in claim 2, further comprising:

(h) a channel formed in said body between and perpendicular to the path of light from said first lens to said detector means, with one wall of said channel lying in said first focusing plane and the opposite wall of said channel lying in said second focusing plane; and (i) said discriminator means is releasably held in said channel.

4. A bar code reader head, as defined in claim 2, wherein said discriminator means is moveable between said first and second focusing planes.

5. A bar code reader head, as defined in claim 2, wherein said first spectrum of light wavelengths is in the range of visible light and said second spectrum of light wavelengths is in the range of infrared light.

6. A bar code reader head, as defined in claim 2, wherein said first lens focuses both said first and second spectra of light wavelengths at one of said first and second focusing planes.

7. A bar code reader head, as defined in Claim 2, wherein both said first and second illuminating sources are disposed within said body at the same time.

8. A bar code reader head, as defined in claim 1, wherein said discriminator means comprises a first discriminator slit parallel to the bars on said bar code and disposed in the path of light from said first lens to said detector means.

9. A bar code reader head, as defined in claim 8, wherein said discriminator means is movable to place said first discriminator slit at either of said first or said second focusing planes.

10. A bar code reader head, as defined in claim 8, wherein said discriminator means comprises at least a second discriminator slit parallel to said bars on said bar code and said discriminator means is movable to place either of said first and second discriminator slits in the path of light from said first lens to said detector means and is movable to place either of said first and second discriminator slits at either of said first and second focusing planes.

11. A bar code reader head, as defined in claim 8, wherein said first discriminator slit is defined as a clear line on a black photoemulsion disposed and developed on a first clear film.

12. A bar code reader head, as defined in claim 11, wherein said discriminator means comprises:

(a) said first clear film;
(b) flexible means disposed on one side of said first clear film;
(c) a second clear film disposed upon said flexible means; and
(d) an open passage defined within said flexible means such that light may pass therethrough from said second clear film to said first discriminator slit; wherein, slight compression of said flexible means will hold said discriminator means releasably within said channel.

13. A bar code reader head, as defined in claim 1, further comprising a second lens between said discriminator means and said detector means.

14. A bar code reader head, as defined in claim 1, wherein said body is formed as a side-pull-out injection molded part.

15. A bar code reader head, as defined in claim 14, wherein said body is formed of a moldable thermoplastic.

16. A bar code reader head, as defined in claim 1, wherein said bar code, said first lens, said discriminator means, and said detector means are disposed along a common axis.

17. A bar code reader head, as defined in claim 16, wherein a mirror is disposed between said first lens and said discriminator means thereby to bend about 90 degrees the light path therebetween.

18. A bar code reader head, as defined in claim 1, wherein said body has a clear window disposed thereon between said bar code and said first lens.

19. A bar code reader head, as defined in claim 1, wherein elements (b), (c), (d), and (e) disposed within said body may be placed within cavities or channels, accessible from one side of said body, said cavities or channels so fitting said parts that no adjustment thereof is required when or after said elements are so placed.

20. A bar code reader head, as defined in claim 19, further comprising a cover fitting over said side of said body, thereby to retain said elements therein.

21. A bar code reader head, as defined in claim 1, further comprising an aperture reducing slit disposed in said body between said first lens and said bar code and parallel to the bars on said bar code.

22. A bar code reader head, as defined in claim 1, wherein the optical axis of said first lens is substantially orthogonal to the plane of said bar code.

23. A bar code reader head, as defined in claim 1, wherein the light from said illuminating source(s) strikes said bar code at an angle of approximately 45 degrees from said optical axis of said first lens.

24. A bar code reader head, comprising:

(a) a body;
(b) a first illuminating source producing a first spectrum of light wavelengths disposed within said body so as to illuminate at least a portion of a bar code;
(c) a second illuminating source producing a second spectrum of light wavelengths, said second spectrum of light wavelengths being different from said first spectrum of light wavelengths, disposed within said body so as to illuminate at least a portion of said bar code;
(d) a lens disposed within said body to focus said first and second spectra of light wavelengths reflected from said bar code; and
(e) detector means disposed within said body to detect light focused by said lens.

* * * * *